United States Patent [19]

Taki et al.

[11] Patent Number: 4,738,778

[45] Date of Patent: Apr. 19, 1988

[54] ZIG ZAG FILTER ELEMENT

[75] Inventors: Yoshihiro Taki, Nagoya; Susumu Miyakawa; Hajime Akado, both of Anjo; Hitoshi Harada, Nishio; Satoshi Inukai, Kariya; Atsushi Sakaida, Nagoya, all of Japan

[73] Assignee: Nippon Denso Co., Ltd., Japan

[21] Appl. No.: 877,728

[22] Filed: Jun. 24, 1986

[30] Foreign Application Priority Data

Jun. 25, 1985 [JP]  Japan ............................... 60-96478[U]
Sep. 27, 1985 [JP]  Japan ............................. 60-148920[U]

[51] Int. Cl.⁴ ...................... B01D 46/52; B01D 27/06; B01D 29/06
[52] U.S. Cl. ............................... 210/493.1; 210/493.5; 210/497.2; 210/506; 55/488; 55/500; 55/521; 55/524
[58] Field of Search .............. 210/493.1, 493.2, 493.5, 210/497.2, 506; 55/488, 498, 500, 502, 521, 524, 501

[56] References Cited

U.S. PATENT DOCUMENTS

| 2,627,350 | 2/1953 | Wicks | 210/493.2 |
| 2,726,184 | 12/1955 | Cox et al. | 210/493.2 |
| 2,914,179 | 11/1959 | Foust | 210/493.1 |
| 3,448,862 | 6/1969 | Kudloxy | 210/493.5 |
| 4,227,953 | 10/1980 | Wasielewski et al. | 55/502 |

FOREIGN PATENT DOCUMENTS

| 0003959 | 9/1979 | European Pat. Off. . | |
| 145885 | 6/1985 | European Pat. Off. | 210/493.5 |
| 1204629 | 6/1981 | Fed. Rep. of Germany . | |
| 1386769 | 12/1964 | France . | |
| 2214505 | 9/1974 | France | 210/493.1 |
| 2477031 | 4/1981 | France . | |
| 140672 | 7/1978 | Japan | 210/493.1 |
| 134779 | 6/1984 | Japan | 210/493.5 |
| 60-87817 | 5/1985 | Japan . | |
| 735842 | 8/1955 | United Kingdom | 55/521 |

OTHER PUBLICATIONS

European Search Report-Appln. No. EP 86 10 8688.

Primary Examiner—Richard V. Fisher
Assistant Examiner—Wanda L. Millard

[57] ABSTRACT

The filter element of the present has a plurality of wavy portions which are so arranged that a plurality of wavy portions make a generally ring like structure. In order to reduce the pressure drop when the fluid flows through the filter element, the present filter element has a special shaped radial gaps. Namely, the width of a first radial gaps, which is formed within adjacent wavy portions and which connects with an inner space formed at the center of the generally ring like structure, increases from the outer end thereof to the inner end thereof. The width of a second radial gap, which is connected with outer atmosphere, decreases from the outer end thereof to the inner end thereof. Both axial ends of the wavy portions are covered with the adhesive sheet on which adhesive layer is cladded.

17 Claims, 7 Drawing Sheets

ZIG ZAG FILTER ELEMENT

FIELD OF THE INVENTION

This invention relates to a filter element which has a good usage for a lubricant oil filter of an internal combustion engine, for example.

BACKGROUND OF THE INVENTION

A conventional type of filter element is described in Japanese patent laid-open publication 60-87817. Namely, a conventional filter element is made of filter member which is bent to be zigzag shape and forms a generally ring-like shape. A filter member is so bent that the filter member makes a plurality of wavy portions, and the wavy portions are so arranged that a plurality of radial gaps are formed within adjacent wavy portions.

The radial gap is formed radially and some of which are connected with an inner space at the inner end thereof. The first radial gap being connected with the inner space is closed its outer end by the filter member. Some radial gaps are not connected with the inner space. Namely, the inner end of the second radial gap is closed by the filter member, and the outer end of the second radial gap opens to an outer atmosphere. The fluid is introduced into the second radial gaps and passes through the wavy portions toward the first radial gap which is connected with the inner space, so that the fluid introduced into the second radial gap flows toward the inner space through the first radial gap.

The conventional filter element, however, causes a large pressure drop when the fluid is introduced into the second radial gap and when the fluid flows from the first radial gap into the inner space. This pressure drop of the fluid flow reduces the efficiency of filtering and also reduce the life of the filter element.

SUMMARY OF THE INVENTION

The filter element of the present invention has an object to reduce the pressure drop of the fluid flow passing through the filter element.

The filter element has another object to increase the filtering efficiency.

Further object of the present invention is to make the fluid flow introduced into the radial gaps of the filter element more smoothly and also to make the fluid flow passing through the radial gap to the inner space more smoothly.

Still further object of the present invention is to promote the producing efficiency of the filter element.

The longitudinal end of the filter element of the present invention is covered with an adhesive sheet in order to make a thickness of an adhesive layer uniform.

In order to attain above objects, a plurality of the wavy portions of this invention are so arranged that a radial gap formed within adjacent wavy portions has a special shape, e.g., the width of the second radial gap decreases from the outer end thereof to the inner end thereof. The second radial gap is shut from the inner space, namely, the second radial gap opens to the outer atmosphere through the outer end thereof.

A plurality of the wavy portions are also provided so that the first radial gap formed therebetween has the special shape e.g., the width of the first radial gap increases from the outer end thereof to the inner end thereof. The first radial gap is connected with the inner space and is closed at the outer end thereof.

In order to attain the above objects, the present invention further employs adhesive sheet comprised of a soft base made of an anti-heat material, which is hard to melt, and a resin adhesive layer which is cladded on the base. The adhesive sheet of this invention is attached on a generally ring like structure of filter element in such a manner that the adhesive sheet closes the both axial ends of filter element in order to make closed chamber within the filter element.

Since the filter element of the present invention introduces the special features described above, the fluid can be introduced into the gap from the outer end thereof smoothly, and also the fluid can flow from the gap toward the inner space smoothly.

The present invention can close the both axial ends of the ring shaped filter element by attaching the adhesive sheet at the both axial ends therof. Since the present invention employs adhesive sheet, the overflow of the adhesive which has been occurred in the conventional type filter element can be prevented. Moreover, the adhesive layer of the present invention can be protected by the base of the sheet. Since the base of the sheet is soft and is hard to reform while the base is heated, the base of the sheet is easy to detouch from adhesive tool and the sheet is easy to attach the end surface of the filter element even though the end surface of the filter element is rough.

DETAIL DESCRIPTION OF THE EMBODIMENT

Figure 1:
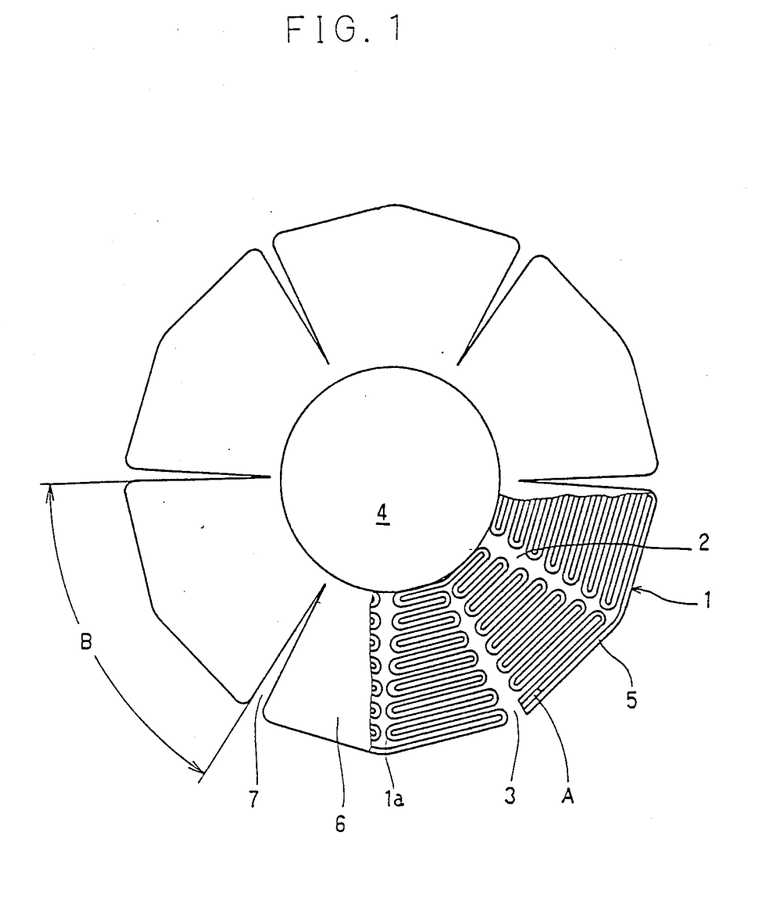
FIG. 1 is a top view of the filter element according to the first embodiment of this invention, a part of the sheet in FIG. 1 is eliminated.
Figure 2:
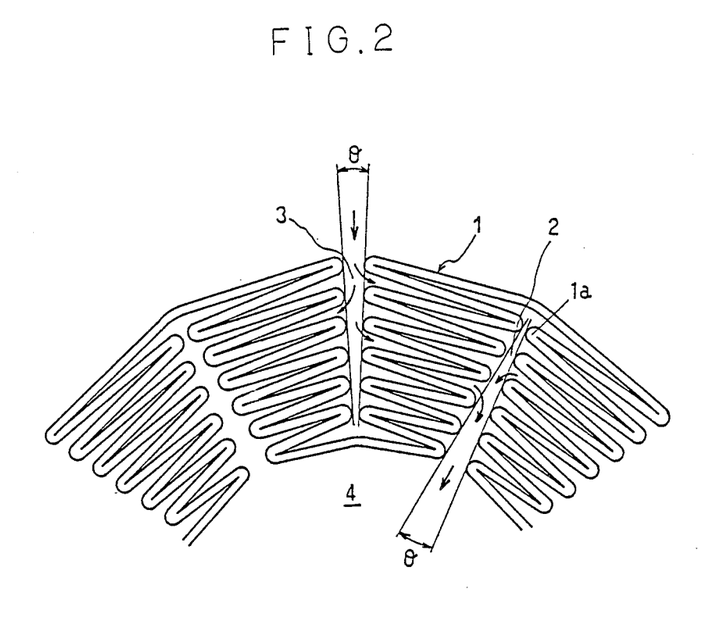
FIG. 2 is an enlarged view of a part of the filter element shown in FIG. 1.
Figure 3:
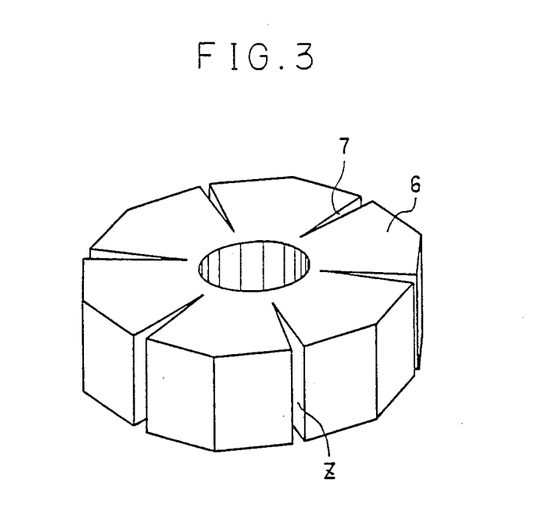
FIG. 3 is a perspective view of the filter element shown in FIG. 1.

As shown in FIGS. 1–3, a single filter member 5 is bent for forming a plurality of wavy portions 1 which are so arranged to make generally ring like structure. Therefore, a plurality of radial gaps 2 and 3 are formed within the adjacent wavy portions, and an inner space 4 is also formed at a center of the generally ring like structure. Since a plurality of wavy portions are made of the single filter member, which is described more detailedly latter, both ends of the single filter member are combined together as indicated by the point A.

Half of a plurality of the radial gaps 2 and 3 are the first radial gaps 2 which are connected with the inner space at the inner end thereof as shown in FIG. 1. The wavy portions are bent to be zigzag so that the wavy portion 1 has a number of bent portion 4, and each edge of the bent portions 1a spaces from the opposed edge of the bent portion 1a. Therefore, the first radial gap 2 is made between the bent portions 1a, the inner end of the first radial gap 2 opens to the inner space 4.

The second radial gaps 3, on the other hand, are closed at their inner end by the filter member in order to apart the inside of the radial gaps 3 from the inner space 4, as shown in FIGS. 1 and 3. As clearly shown in FIG. 2, the width of a each of the first radial gaps 2 increases from the outer end to the inner end so that the first radial gaps 2 is a taper shape 7. The second radial gap 3, on the other hand, reduces the width thereof from the outer end to the inner end so that the second radial gap 3 also is a taper shape.

Both upper and lower sides of the first radial gap 2 are closed by the resin adhesive sheet 6 which is made of hot melt type material such as polyamide, for example.

Figure 4:
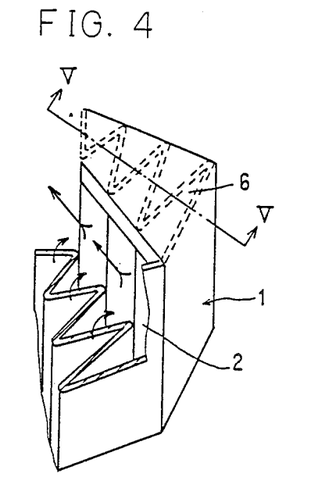
FIG. 4 is a perspective view of a part of the filter element shown in FIG. 1.
Figure 5:
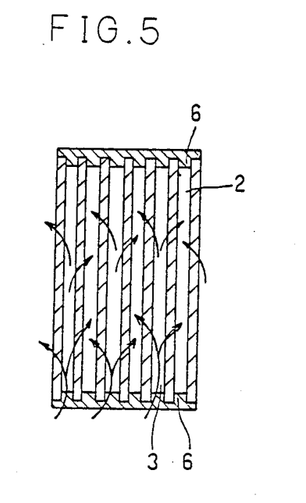
FIG. 5 is a sectional view taken along with V—V line of FIG. 4.

The shape of the second radial gap 3 is a taper shape which is the same shape as that of opening area within the adjacent bent portions 1a. There are six opening 7 equally apart from each other along with the circumferential direction of the ring like structure. The second radial gap is connected with the opening 7 at both radial and axial end Z of which (shown in FIG. 3). As shown in FIGS. 4 and 5 a couple of the resin adhesive sheet 6 make a closed chamber therebetween.

Figure 6:
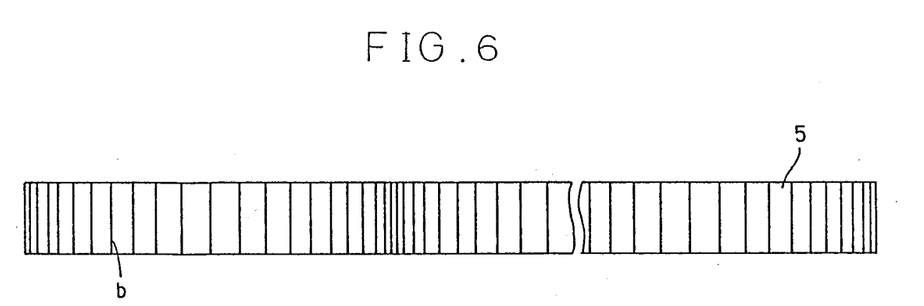
FIG. 6 is a front view of the filter member of FIG. 1, before the filter member is bent.
Figure 7:
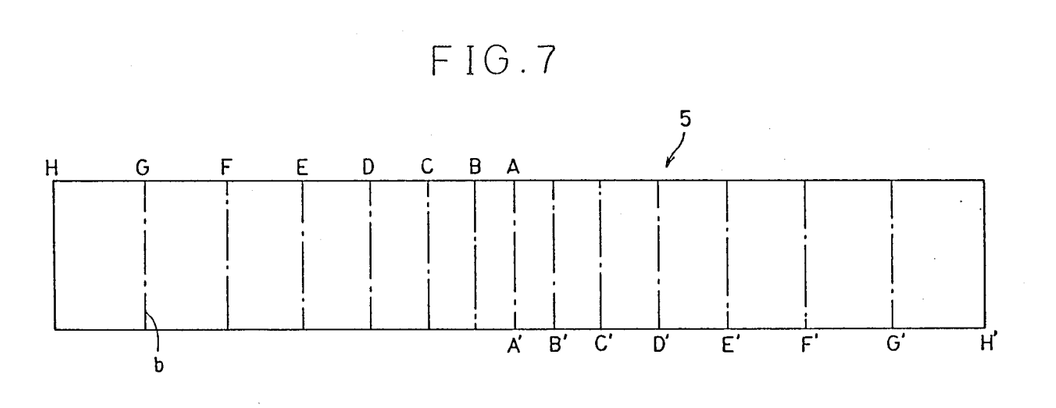
FIG. 7 is an enlarged view of FIG. 6.

A single filter member belt which is shown in FIGS. 6 and 7, makes a plurality of wavy portions 1. The filter member 5 is bent at the predetermined line b, the length between adjacent predetermined lines b is continuously varied as shown in FIG. 7 so that the trapezoid wavy portion 1 is made after the filter member has been bent.

The passage of the fluid of this filter element is shown hereinafter. When the fluid flows from lower side of the filter element, the fluid is introduced into the second radial gap 3 through a plurality of axial end openings 7 and radial end openings Z. The fluids then passes through the wavy portions 1 from the second radial gap 3 towards the first radial gap 3. The fluid introduced into the first radial gap 2, then, flows toward the inner space 4. The particulates contained in the fluid is trapped within the filter member when the fluid passes through the wavy portions 1.

The shape of the second radial gap 3 as well as the opening 7 are taper, namely radially outward portion thereof are wider than the radially inward portion so that the fluid can be introduced into the second radial gap without causing serious pressure drop.

The first radial gap 2 which is connected with the inner space 4, on the other hand, increase its width toward inner side of which. Therefore, the filter element of this invention can reduce the pressure loss of the fluid flowing therethrough.

Figure 8:
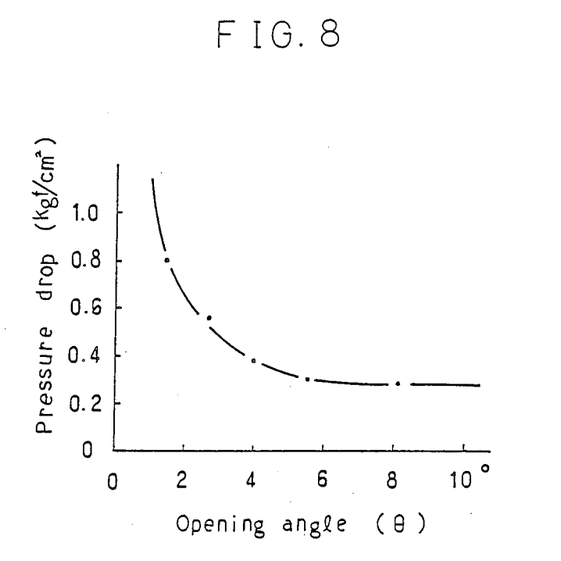
FIG. 8 is a graph showing the relationship between the opening angle $\theta$ and the pressure drop of the fluid flow.

FIG. 8 shows the relationship between the opening angle $\theta$ of the radial gaps 2 and 3 and the pressure loss of the fluid. The opening angle $\theta$ is the angle between a couple of lines which connects the tangent of the bent portions 1a, as shown in FIG. 2. The pressure loss of the fluids in FIG. 8 is the value detected when the lubricant oil for internal combustion engine is used as the fluids flowing through the element. The testing conditions of the examination shown in FIG. 8 are as follows: The lubricant oil is SAE #30, the amount of the lubricant oil is 30 l/min, and the temperature of the lubricant oil is about 80° C. It is clearly shown from FIG. 8 that the pressure loss is varied in accordance with the angle $\theta$. The filter element becomes effective when the angle $\theta$ is at least 4°, and becomes more effective when the angle $\theta$ is at least 5°.

Figure 9:
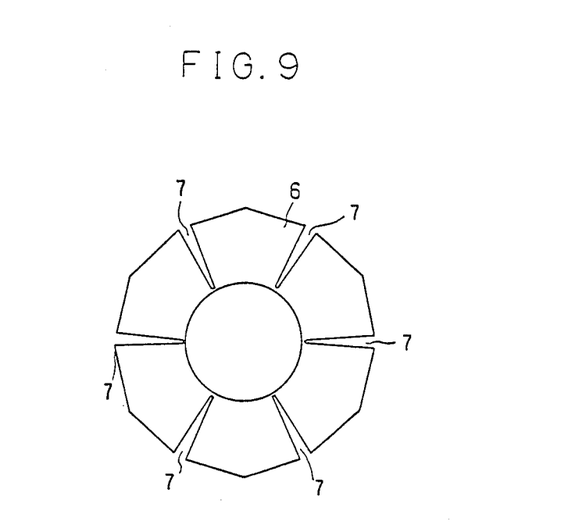
FIG. 9 is a front view of the adhesive sheet shown in FIG. 1.

As shown in FIG. 9, the shape of the sheet 6 is the same as the end shape of the filter-member 1. The functions of the base 6a when the base is set at the axial end face of the ring like structure and when the base is heated by the heat tool such as a hot plate are described hereinafter:

1. To prevent the adhesive from depositing at the heat tool (in order to make the sheet easily detach from the tool).
2. To prevent such defect as pin hole in adhesive layer which may be generated while the adhesive layer is melt (during the heat operation).
3. To reinforce the adhesive layer.

Since the base is heated while the attaching operation, the base 6a should be made such material which is hard to melt, and also since the base should be rolled and be punched, the material of the base 6a must be soft. Therefore, the paper having a predetermined thickness such as 130 $\mu$m (kraft paper or masking paper, for example) or steel film or nickel film having the thickness of 10 $\mu$m is suitable for the base 6a. The paper is more valuable from the point of the capital cost, the aluminum film, on the other hand, is more valuable from the view point of the high speed operation. The effect of the high speed operation of the aluminum film is described in Table 1.

TABLE 1

| required time for melting the adhesive layer within a circle the diameter of which is $\phi$28.5 mm | | |
|---|---|---|
| | method for sheet polyamide type hot melt adhesive | |
| temperature of hot plate | paper | aluminum film |
| 220° C. | 32 second | 24 second |
| 230 | 25 | 17 |
| 240 | 20 | 11 |
| 250 | 16 | 7 |

(Notice) the thickness of the adhesive layer 200 $\mu$m

As described in Table 1, the required time for melting the adhesive cladded on the base is short when the base is made of aluminum, so that the attaching operation of the sheet 6 can be carried out quickly. The thickness of the base when the base is made of aluminum film is preferred within the suitable range between 10–200 $\mu$m in order to roll the base.

Hot melt adhesive (polyamide hot melt DPXH 610 producted by Henkeru Hakusui Co. Ltd., Movamid 1030 producted by Mitsubishi Kasei Co. Ltd., or polyester hot melt PES-X-412 producted by Toa Gosei Kagaku Kogyo Co. Ltd., or B stage epoxy resin (NEF-1200 producted by Nitto Denko Co., Ltd., )) can be used for the adhesive layer 6b. The soft point of hot melt type adhesive layer is better to be under 150° C. from the view point of mass production. As described in Table 2, the thickness of the adhesive layer is better between 50–600 $\mu$m.

TABLE 2

| thickness of the | 40 | 50 | 100 | 200 | 400 | 600 | 700 |

TABLE 2-continued

| adhesive layer (μ) | | | | | | | |
|---|---|---|---|---|---|---|---|
| adhesive condition | X | O | ⊚ | ⊚ | ⊚ | O | Δ |
| statement | void | — | — | — | — | — | much permeating |

⊚: very good
O: good
Δ: small problem
X: no good

The viscosity of the adhesive layer is better between 5-15,000 poise in order to keep the adhesive from permeating into the filter member. The base and the adhesive layer do not have to be combined together, the base and the adhesive can be made independently and be attached each other.

Figure 10:
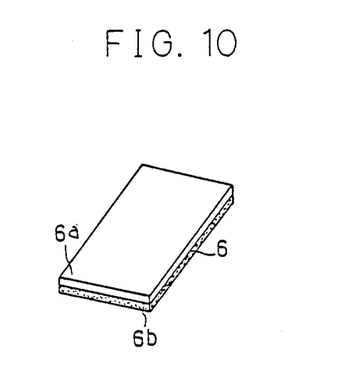
FIG. 10 is a perspective view of a part of the filter member.

The detail attaching operation of this invention is described hereinafter. The filter member is bent in order to make the generally ring like structure, then the both ends of the filter member (point A in FIG. 1) are combined together by the adhesive (such as polyamide type hot melt adhesive). Mean while the adhesive sheet 6 is punched out in order to have the same ring like shape as that of the generally ring like structure (shown in FIG. 9) from the rolled adhesive sheet 6 (shown in FIG. 10).

The adhesive sheet is then attached on the end face of the filter element in such a manner that the adhesive layer 6b of the sheet 6 faces the filter element. The heat tool such as a hot plate is attached on the base 6a side of the sheet 6 in order to melt the adhesive 6b, and fix the sheet 6 onto the filter element. The closed chamber (shown in FIGS. 4 and 5) is formed within the filter member and a couple of the sheets.

The operation of the filter element when the filter element is used as the filter for the lubricant oil of the internal combustion engine is described hereinafter. The filter element 8 is contained in a metal contaner 13 in such a manner that the inner side of the element 8 is fixed with a punch metal 12 and the punch metal is fixed with an end plate 14. The end plate 14 has a screw hall 14a at the center thereof, and a plurality of openings 14b around the screw hole 14a. The end plate 14 is fixed at the opening edge of the metal contaner 13. A ring plate 18 which is welded with the end plate 14 is fixed with the opening edge of the container 13. Numeral 15 in FIG. 11 shows a check valve made of rubber, numeral 16 shows a spring, numeral 19 shows a metal end plate fixed with the upper end of the punch metal 12, and numeral 17 shows a gasket made of rubber.

Figure 11:
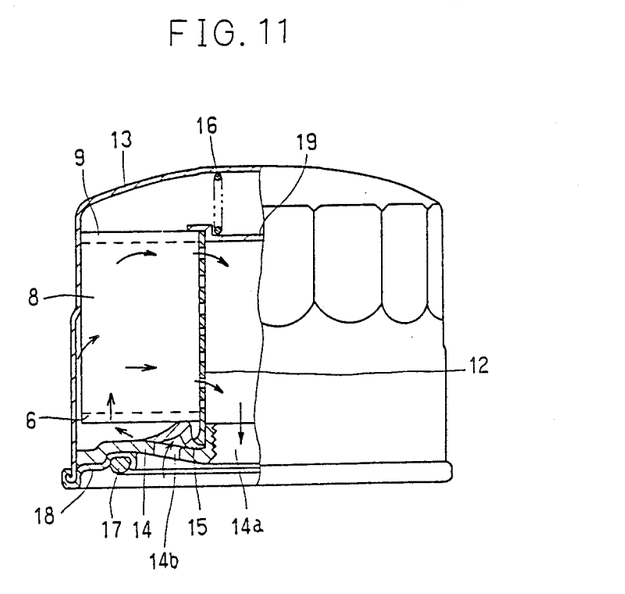
FIG. 11 is a partially sectional view of the filter in which the filter element is employed.

As shown by the arrow in FIG. 11, the lubricant oil is introduced into the container 13 through the opening 14b, keeping the check valve 15 open. The lubricant oil introduced into the container, then flows into the gap through the opening 7 and Z and passes through the wavy portion, after that the oil flows into the inner space 4 through the punch metal 12. The lubricant oil after passing through the filter, then, returns to the internal combustion engine from the screw hole 14a. By the way, the lubricant oil is introduced into the wavy portion mainly from the slit 7 when the lubricant oil is introduced into the container 13 from the lower side thereof as shown in FIG. 11. The lubricant oil, on the other hand, is introduced into the wavy portion mainly from the slit Z when the lubricant oil is introduced vertically.

The filter element of this invention can be modified as follows:

(1) Though both the first and second radial gaps 2 and 3 are designed to be taper in the above embodiment, the filter element of this invention can be used effectively even when only one of the first and second radial gaps 2 and 3 is designed to be taper.

Figure 12:
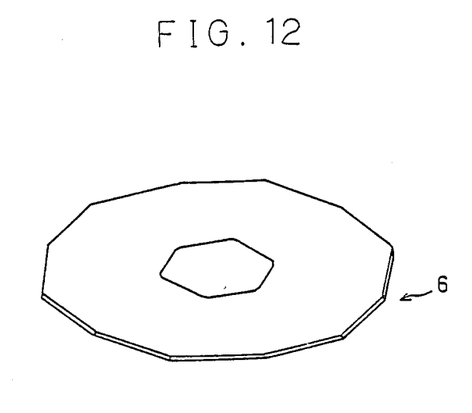
FIG. 12 is a perspective view of the adhesive sheet according to the other embodiment of the present invention.
Figure 13:
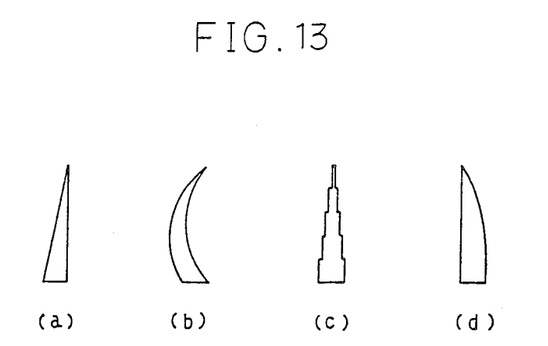
FIGS. 13(a)–(d) are diagrams showing the shape of the radial gaps according to the other embodiment of this invention.

(2) Though the filter element, shown in FIGS. 1 and 3, has axial openings 7 at the both upper and lower ends of the adhesive sheet 6, the position of the openings 7 can be varied, or the openings 7 of this invention can be made at the only one surface of the element, namely, the opening slit 7 can be formed at the one side of the element and the another side of the element can be closed. It is also possible that both sides of openings are cancelled by using the adhesive sheet 6 shown in FIG. 12, so that the fluid is introduced into the filter element from the radial opening Z at the side face of the element.

(3) The space between the zigzag portion of the wavy portions connecting to the second radial gap 3 does not have to be covered.

(4) Though all wavy portions of the above embodiment shown in FIG. 1 is made of a single filter member, each block B of the wavy portion can be made from each independent filter member, so that the filter element is made from a plurality of separated blocks B.

(5) The pitch between the adjacent bent portions of the wavy portion can be varied from each other. (6) The shape of the filter element of this invention can also be changed, the filter element of this invention can be formed as any polygonal shape depending on the number of the blocks B of the wavy portions.

(7) A float portion can be provided in the radial gap between opposed bent portions of the wavy portions.

(8) The shape of the radial gaps can be varies as such the shapes shown in FIGS. 10a–10d. The shapes shown in these figures can also reduce the pressure loss of the fluid as well as that shown in the above embodiment.

(9) The filter element of this invention can also be used as air filter for internal combustion engine.

What is claimed is:

1. A filter element comprising:
    a ribbon-like filter member forming a plurality of sector-like wavy portions arranged to form a ring-like structure about a central opening with radial gaps between adjacent portions,
    said filter member being of zig-zag configuration in each of said portions with the circumferential extent of said member in each portion decreasing radially inwardly of said structure, each of said portions having radial inner and outer ends and axial opposite sides,
    a first set of alternate of said gaps being open to said central opening at their radial inner ends and closed at their radial outer ends,
    a second set of alternate of said gaps being closed at their radial inner ends and open at their radial outer ends,
    at least one of said first and second sets of alternate gaps being of varying width along their radial extent; and
    a sheet having a soft base of heat-resistant material and a resin adhesive layer thereon attached on an axial side of said ring-like structure to close the corresponding axial side of said portions forming said first set of gaps and the corresponding axial side of the latter, said sheet having a set of radially extending gap portions defining radial openings therebetween aligned with said second set of gaps for admission of fluid thereto through said radial openings.

2. A filter element claimed in claim 1; wherein, said adhesive layer is made of heat melt type resin adhesive chosen from the group consisting of polyamide and polyester.

3. A filter element claimed in claim 2; wherein, the thickness of said adhesive layer is between 50–600 μm.

4. A filter element claimed in claim 3; wherein, the viscosity of said adhesive is between 5–15,000 poise.

5. A filter element claimed in claim 1, wherein: the width of said first set of radial gaps tapers radially outward.

6. A filter element claimed in claim 5, wherein: an including angle of the taper shape of said first set of radial gaps is at least 4°.

7. A filter element claimed in claim 5, wherein: an including angle of the taper shape of said first set of gaps is at least 5°.

8. A filter element claimed in claim 1, wherein: the width of said second set of radial gaps tapers radially inward.

9. A filter element claimed in claim 8, wherein: an included angle of the taper shape of said second radial gap is at least 4°.

10. A filter element claimed in claim 8, wherein: an included angle of the taper shape of said second radial gap is at least 5°.

11. A filter element claimed in claim 1, wherein: the width of said first set of radial gaps tapers radially outward; and the width of said second set of radial gaps tapers radially inward.

12. A filter element claimed in claim 11, wherein: an included angle of the taper shape of said first set of radial gaps is the same as that of said second set of radial gaps.

13. A filter element claimed in claim 1, wherein: the width of said first set of radial gaps increases radially inward.

14. A filter element claimed in claim 1, wherein: the width of said second set of radial gaps decreases radially outward.

15. A filter element claimed in claim 1; wherein, said base is made of a material chosen from the group consisting of kraft paper, masking paper, aluminum film, steel film, nickel film and copper film.

16. A filter element claimed in claim 1; wherein, the thickness of said base is between 10–200 μm.

17. A filter element claimed in claim 1 including another sheet attached on the other axial side of the ring-like structure to close the corresponding axial side of the portions forming the first set of gaps, said another sheet having a set of radially extending gap portions defining radial openings therebetween aligned with the second set of gaps for admission of fluid thereto through said radial openings.

* * * * *